United States Patent [19]
Woinsky

[11] 4,078,675
[45] Mar. 14, 1978

[54] SEAL LEG AND METHOD FOR TRANSFERRING PARTICULATE SOLIDS BETWEEN ZONES OF DIFFERENT PRESSURES

[76] Inventor: Samuel Gary Woinsky, Irvine, Calif.

[21] Appl. No.: 705,060

[22] Filed: Jul. 14, 1976

[51] Int. Cl.$^2$ .............................................. B01J 3/02
[52] U.S. Cl. ................................. 214/17 B; 214/152
[58] Field of Search ............................ 214/17 B, 152; 23/288 C, 288 E

[56] References Cited

U.S. PATENT DOCUMENTS

| 2,670,278 | 2/1954 | King et al. ..................... 214/17 B X |
| 2,925,928 | 2/1960 | Martin ........................... 214/17 B X |

*Primary Examiner*—Robert G. Sheridan

[57] ABSTRACT

The invention provides for an improved seal leg and method for transferring particulate solids in a non-fluidized condition from a first pressure zone to a second pressure zone while controlling the level of solids in the first pressure zone or in the seal leg. A relatively uniform pressure gradient is produced across the length of the seal leg by bleeding gas into or out of the seal leg along its length. Bleeding gas as aforesaid permits the use of a shorter seal leg and a smaller diameter seal leg for a given solids flow rate as compared to a seal leg not provided with means for bleeding gas in or out along its length. The pressure gradient along the length of a seal leg not provided with means for bleeding gas in or out along its length will be highly nonuniform resulting in retarded solids flow due to localized high pressure gradients and a low overall average pressure gradient resulting in a substantial length requirement for the seal leg to maintain a pressure seal.

4 Claims, 2 Drawing Figures

SEAL LEG AND METHOD FOR TRANSFERRING PARTICULATE SOLIDS BETWEEN ZONES OF DIFFERENT PRESSURES

BACKGROUND OF THE INVENTION

This invention relates to an improvement in the transfer of particulate solids through a conduit from one pressure zone to another pressure zone. The invention finds application in the chemical processing industry where it is desired to transfer granular solids through a pipe from a first vessel held at a first pressure to a second vessel held at a second pressure while maintaining the pressure in each vessel. The transfer of such solids is required during the processing of coal into gas and oil which results in the production of granular particles of char or coke which are transferred through a pipe connecting vessels held at different pressures.

Double gate valves and star feeders are commonly used in pipes communicating with vessels maintained at different pressures where it is desired to maintain a separation between the two pressure zones but allow for the flow of particulate solids between the vessels. The presence of particulate solids in the communicating pipe may also be used as a seal to separate the two pressure zones and when so used the communicating pipe is referred to as a seal leg or a seal pipe.

Seal legs are of a substantial length because it has been observed that solids will now flow through the pipe (the seal leg) at the required flow rate if the pipe is too short. Consequently, if the particulate solids are to be used as a pressure seal in the pipe, the pipe is relatively long. For example, a seal leg length of 150 feet would be required to pass 30,500 pounds per hour of a 0.0041 inch diameter solids having a bulk density of 149.5 pounds per cubic foot and an angle of repose of 45° from an upper pressure zone at atmospheric pressure to a lower pressure zone at 30 psig through a 4 inch interior diameter seal pipe.

Seal legs of such length are objectionable, however, because they end to promote plugging within the pipe and they may be in violation of local building codes if they cause the height of the structure with which they are associated to be greater than permitted by such codes.

SUMMARY OF THE INVENTION

It has been discovered that such seal legs may be made substantially shorter and/or smaller in diameter and still allow for the flow of solids under non-fluidized conditions at the required flow rate if a relatively uniform pressure gradient is provided over the length of the seal leg. This relatively uniform pressure gradient is provided by a plurality of gas conduits tapped in spaced relationship into and across the length of the seal leg for communication therewith and adapted for communication with either or both of the high pressure or the low pressure zones between which the solids are transferred. Pressure control means are provided in communication with each of the gas conduits and are adapted to introduce gas into or out of the seal leg through the conduits so that a non-fluidized condition and a relatively uniform pressure gradient across the length of the seal leg can be provided.

DESCRIPTION OF THE DRAWINGS

The invention will be more specifically described in connection with the accompanying drawings in which.

DESCRIPTION OF THE PREFERRED EMBODIMENTS

Figure 1:
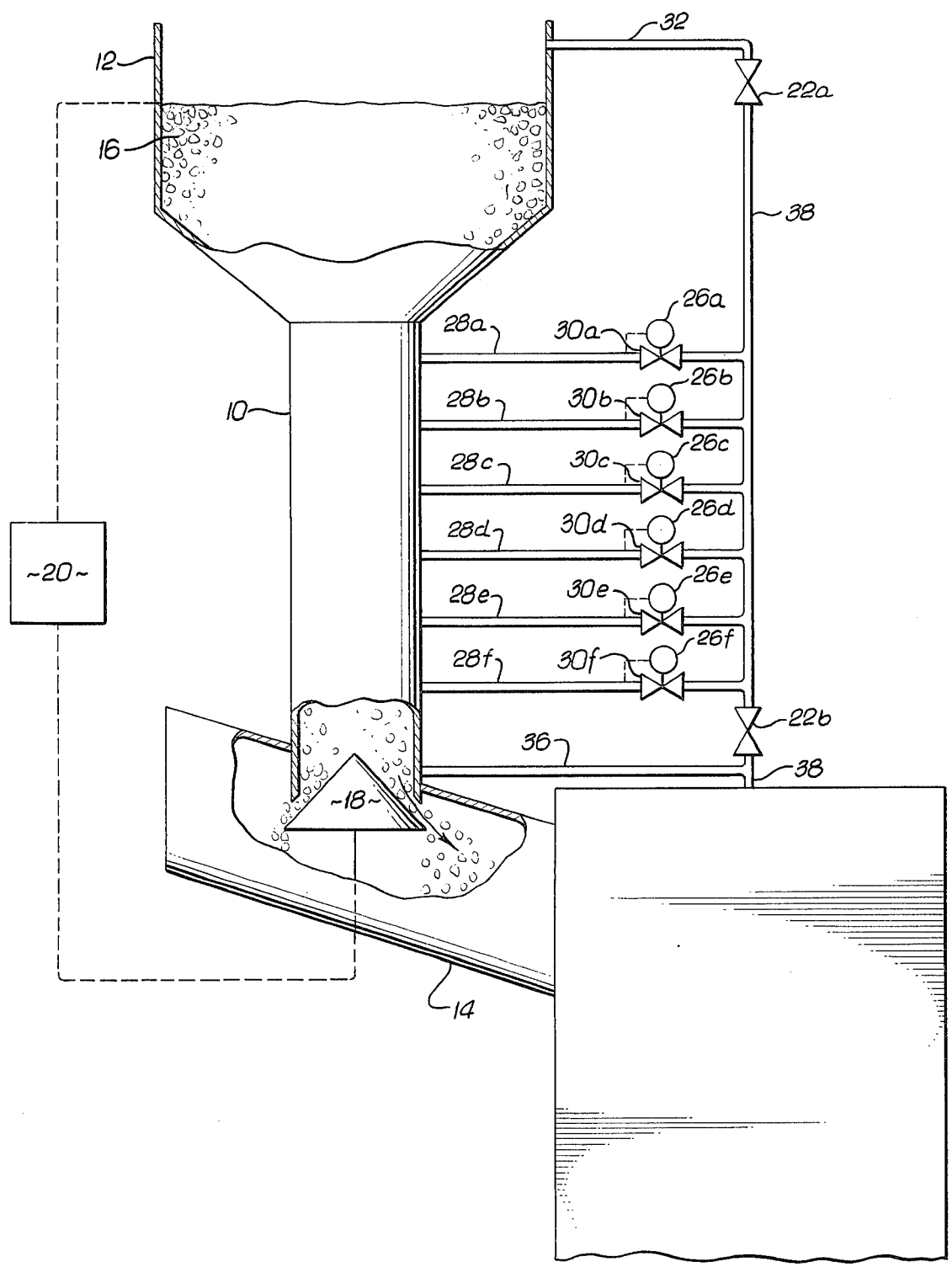
FIG. 1 is an elevation view of one embodiment of the seal leg of the instant invention.

Referring now to FIG. 1, seal leg 10 is in communication with feed vessel 12, which represents a first pressure zone, and with receiving vessels 14, which represents a second pressure zone. Feed control valve 18 controls the rate at which the particulate solid 16 flow through the seal leg 10. Level controller 20 regulates feed control valve 18 and is set to maintain the level of particulate solids 16 within the feed vessel 12 at a predetermined height.

Gas conduits 28a through 28f are tapped into the side of the seal leg 10 and communicate therewith and with receiving vessel 14 through gas conduit 38 when valve 22b is open and valve 22a is closed, or with feed vessel 12 through gas conduits 38 and 32 when valve 22b is closed and valve 22a is open. Gas conduit valves 30a through 30f are provided in each of said gas conduits 28a through 28f and are regulated by pressure controllers 26a through 26f which measure the pressure in seal leg 10 at the point where their associated conduits 28a through 28f are tapped.

Pressure controllers 26a through 26f are set to produce a relatively uniform pressure gradient along the length of the seal leg 10 by either introducing gas into seal leg 10 or removing gas from seal leg 10.

A screen (not shown) is provided in conduits 28a through 28f or in the wall of the seal leg 10 to prevent the particulate solids from entering the gas conduits 28a to 28f. Also, the gas conduits 28a to 28f may be inclined on an angle to the seal leg 10 to keep solids from entering the gas conduits 28a to 28f. In addition, the conduits 28a to 28f may feed into the seal leg 10 at multiple points around its periphery through the use of a distributor ring conduit (not shown) encircling the seal leg 10. The number of gas conduits 28a to 28f is not limited to 6 conduits as shown in FIG. 1 but may be any number that will result in a shortening of the seal pipe and/or a reduction in the diameter thereof.

In operation, particulate solids 16 flow into feed vessel 12 and level controller 20 is set to maintain the particulate solids 16 at a predetermined level within feed vessel 12 by regulating feed control valve 18. As the particulate solids 16 flow through seal leg 10, valve 22a is opened and valve 22b is closed, or valve 22a is closed and valve 22b is open to communicate with the first or second pressure zones, respectively, and with gas conduits 28a through 28f. The opening or closing of valves 22a and 22b will depend upon the properties of the solids, the pressures in pressure zones one and two, the seal pipe dimensions, and the setting of pressure controllers 26a through 26f. Thus, the regulation of valves 22a and 22b and of pressure controllers 26a through 26f is performed during operation by a person skilled in the art who allows for the aforesaid variables by regulating valves 22a and 22b and pressure controllers 26a through 26f so that a relatively uniform pressure gradient and a non-fluidized condition is provided across the length of seal leg 10.

Gas is bled in or out of the seal leg to adjust relative velocities between the gas and solid to give an approximate uniform pressure gradient. The bleed is required due to changes in gas density or solids bulk density along the length of the seal leg.

By providing a relatively uniform pressure gradient within the seal leg as aforesaid, it has been found that seal leg lengths and diameters may be substantially reduced as compared to seal legs that are not provided with means for bleeding gas in or out along their length and thus have highly nonuniform pressure gradients. For example, the 150 foot seal leg described hereinabove may be reduced to 37.5 feet if a relatively uniform pressure gradient is provided across the 37.5 feet of seal pipe.

The relationship among the parameters of the invention is expressed by the equation:

$$W_s = \frac{1.056 \rho (1-F) D_o^{2.7}}{(\tan \beta)^{0.514} D_p^{0.189}}$$

wherein:

$W_s$ is the solids flow rate in pounds per second (lbs/sec)

$\Delta P/\Delta L$ is the pressure gradient across the entire length of seal leg $$(\frac{\text{lbs}}{\text{ft}^2} \cdot \frac{1}{\text{ft}})$$

$$F = \frac{\frac{\Delta P}{\Delta L}}{\rho},$$

wherein $\Delta P$ is the difference in pressure between vessels 12 and 14 $\Delta L$ is the length of the seal leg, and $\rho$ is the bulk density of the solids.

$D_o$ is the seal leg inside diameter in feet (ft)
$\beta$ is the angle of repose of the particles
$D_p$ is the diameter of the particles in feet (ft)

Having established the operating conditions of $W_s$, $\Delta P$, $\beta$, $D_p$ and $\rho$, the value for $\Delta L$ or $D_o$ may be set and the value for the remaining condition ($\Delta L$ or $D_o$) determined from the above equation.

Figure 2:
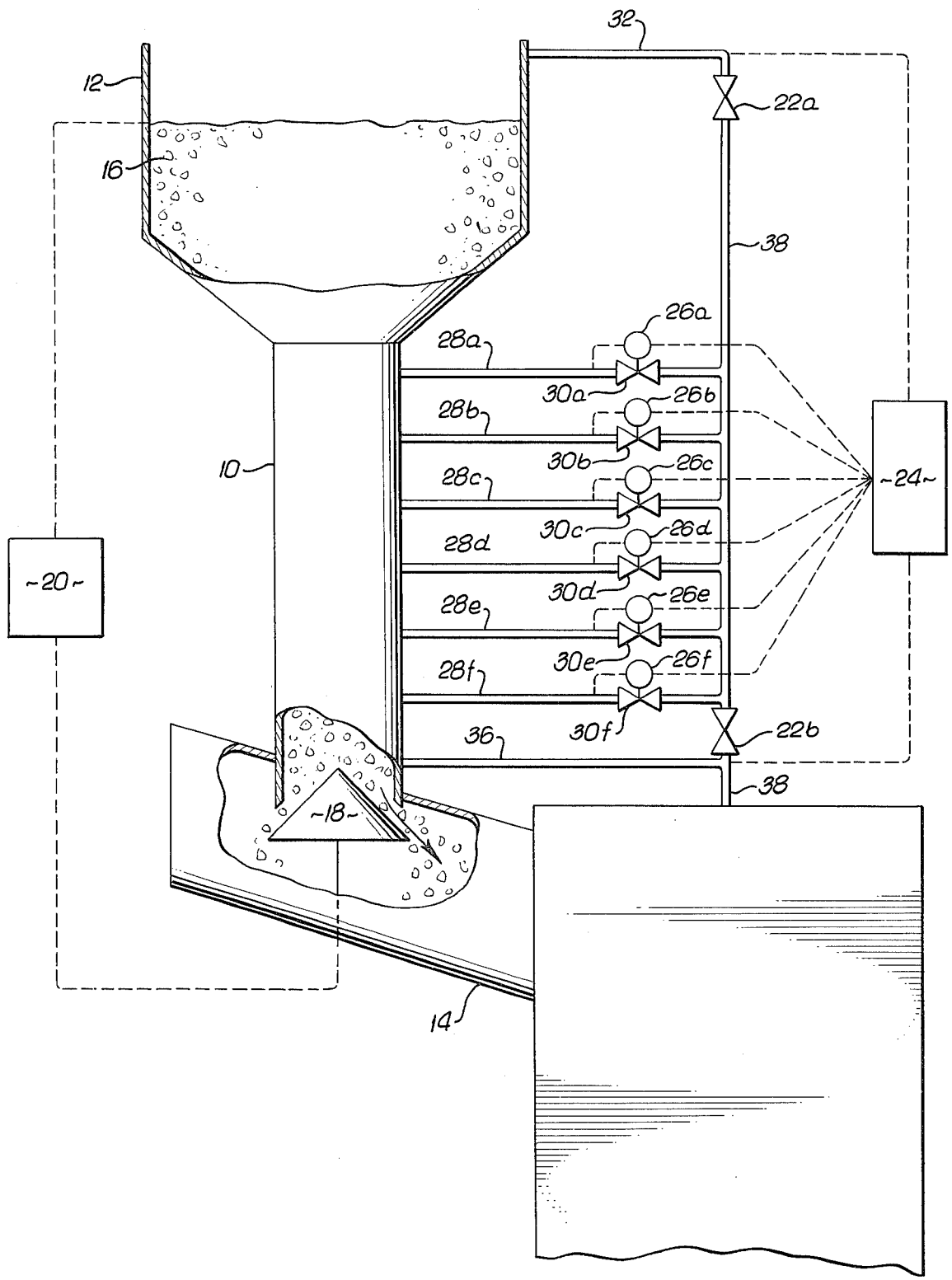
FIG. 2 is an elevation view of a second embodiment of the seal leg of the instant invention.

Another embodiment of the present invention is illustrated in FIG. 2 which is essentially the same as the embodiment illustrated in FIG. 1 except for the provision of a pressure gradient reset device 24. The reset device 24 senses the pressure difference between vessels 12 and 14 through conduits 32 and 38. If the pressure difference between vessels 12 and 14 changes, the pressure gradient reset device 24 resets the pressure settings of pressure controllers 26a to 26f to maintain a relatively uniform pressure gradient along the entire length of seal leg 10.

If the pressure in the receiving vessel 14 is greater than the pressure in feed vessel 12, the embodiment in FIG. 1 may be modified by eliminating feed control valve 18 and level controller 20 provided the seal leg portion between the bottom of vessel 12 and gas conduit 28a, referred to as $\Delta L_1$, is made long enough so that the solids level is maintained within $\Delta L_1$. With the solids level maintained within the $\Delta L_1$, the seal leg will function as a level controller without the need for feed control valve 18 and level controller 20. The length of $\Delta L_1$ is determined by the following equation:

$$W_s = \frac{1.056 \rho (1-F_1) D_O^{2.7}}{(\tan \beta)^{0.514} D_p^{0.189}}$$

wherein:

$$F_1 = \frac{\frac{\Delta P_1}{\Delta L_1}}{\rho}$$

wherein $\Delta P_1$ is the difference in pressure between vessel 12 and gas conduit 28a. The remaining terms have been previously defined.

In the aforesaid modification of FIG. 1 wherein the feed control valve 18 and level controller 20 are eliminated, pressure gradient reset device 24 as illustrated in FIG. 2 may be added to said modification in the same position and to function in a manner similar to that discussed in connection with the FIG. 2 embodiment.

The embodiments described hereinabove are considered to be preferred but it must be understood that other variations and modifications of these embodiments may be made by one skilled in the art having the benefit of the inventive concept disclosed herein. Accordingly, the invention is not limited to the disclosed embodiments but is intended to cover all embodiments and variations and modifications which fall within the spirit and scope of the invention.

I claim:

1. In an improved seal leg for transferring particulate solids from a first vessel having a gas at a first pressure to a second vessel having a gas at a second pressure, the improvement consisting of a first plurality of gas conduits in spaced relationship across the length of said seal leg and in communication therewith, a second plurality of gas conduits in communication with said first plurality of gas conduits and with said first and second vessels, pressure control means in communication with each of said first plurality of gas conduits and adapted to be set to produce a relatively nonfluidizing uniform pressure gradient along the length of said seal leg by bleeding gas into or out of said seal leg, valve means associated with said second plurality of conduits for controlling the flow of gas into or out of said first and second vessels, whereby said seal leg may be shorter and/or of a smaller diameter than a seal leg without said first plurality of gas conduits.

2. A seal leg as set forth in claim 1 and having a level control means for controlling the level of particulate solids in said first pressure zone or in said seal leg.

3. A seal leg as set forth in claim 1 and having a pressure gradient reset means adapted to sense any change in difference in pressure between said first and second vessels and to make a corresponding change to the pressure settings on said pressure control means to maintain a relatively uniform pressure gradient along the length of said seal leg.

4. A method for transferring particulate solids through a seal leg from a first vessel having gas at a first pressure to a second vessel having gas at a second pressure, said seal leg having a first plurality of gas conduits in spaced relationship across the length of said seal leg and in communication therewith, and a second plurality of gas conduits in communication with said first plurality of gas conduits and with said first and second vessels, said method comprising the steps of:

a. maintaining said solids at a predetermined level within said first vessel as said solids flow into said seal leg, b. opening the communication between said second plurality of gas conduits and one of said vessels and closing the communication between said second plurality of gas conduits and the other said vessel, and c. regulating the pressure within said second plurality of gas conduits to produce a relatively non-fluidized uniform pressure gradient across the length of said seal leg by bleeding gas into or out of said seal leg and said first and second vessels, and thereby allow for the use of a seal leg that is shorter and/or of a smaller diameter as compared to a seal leg without a relatively uniform pressure gradient across the length thereof.

* * * * *

UNITED STATES PATENT AND TRADEMARK OFFICE
CERTIFICATE OF CORRECTION

PATENT NO. : 4,078,675
DATED : March 14, 1978
INVENTOR(S) : Samuel Gary Woinsky

It is certified that error appears in the above-identified patent and that said Letters Patent are hereby corrected as shown below:

On the title page insert
--Assignee: Occidental Petroleum Corporation, Los Angeles, California--;

Column 1, line 41, delete "end" and insert therefor --tend--.

Signed and Sealed this

Eighth Day of August 1978

[SEAL]

Attest:

RUTH C. MASON
*Attesting Officer*

DONALD W. BANNER
*Commissioner of Patents and Trademarks*